United States Patent [19]

Schule

[11] 4,437,435
[45] Mar. 20, 1984

[54] AUTOMATIC ANIMAL FEEDER

[76] Inventor: Sheldon D. Schule, 1313 Boston, Clarkston, Wash. 99403

[21] Appl. No.: 470,210

[22] Filed: Feb. 28, 1983

[51] Int. Cl.$^3$ .............................................. A01K 5/02
[52] U.S. Cl. .................................................. 119/51.13
[58] Field of Search ................. 119/51.13, 51.11, 51.5, 119/51 R, 56 R

[56] References Cited

U.S. PATENT DOCUMENTS

| | | | |
|---|---|---|---|
| 2,500,243 | 3/1950 | Dixon | 119/51.13 |
| 2,847,066 | 8/1958 | Kleiber et al. | 119/51.11 X |
| 3,022,767 | 2/1962 | Malek | 119/51.11 |
| 3,050,029 | 8/1962 | Appleton | 119/51.11 X |
| 3,340,851 | 9/1967 | Frank et al. | 119/51.13 |
| 3,955,537 | 5/1976 | Yujiri | 119/51.13 |
| 3,999,519 | 12/1976 | Rodemeyer | 119/29 |
| 4,027,627 | 6/1977 | Fillion | 119/51.11 |
| 4,059,072 | 11/1977 | Vassailo et al. | 119/51.13 |
| 4,296,710 | 10/1981 | Sillers | 119/51.11 |
| 4,324,203 | 4/1982 | Chiappetti | 119/51.11 |

Primary Examiner—Hugh R. Chamblee
Attorney, Agent, or Firm—Keith S. Bergman

[57] ABSTRACT

A feeder to provide measured quantities of food at predetermined time intervals for animal feeding. A cylindrical base supports an annular fine timing disc for pivotable motion relative thereto and a circular storage disc, having plural food reservoirs radially spaced about its periphery, immediately thereabove. Each food reservoir is provided with valve structure in its lowermost part that opens by gravity action to sequentially discharge the contents in channels defined through the fine timing disc and the base. Driving mechanism is provided to rotate the storage disc relative to the base member to determine the period between successive good discharges and pivotable motion of the fine timing disc regulates the time of discharge within a period.

4 Claims, 6 Drawing Figures

AUTOMATIC ANIMAL FEEDER

BACKGROUND OF INVENTION

1. RELATED APPLICATIONS

There are no applications related hereto heretofore filed in this or any foreign country.

2. FIELD OF INVENTION

My invention relates generally to automatic feeding devices for smaller animals and more particularly to such a device that disburses predetermined quantities of food at predetermined time intervals from plural storage reservoirs.

3. DESCRIPTION OF PRIOR ART

The feeding of smaller animals and fish without constant attention and in the absence of a human has long presented a problem and many various devices to resolve this problem have heretofore become known. The instant invention adds a new and novel member to this class of device.

In automatic animal feeding devices a reservoir or supply of food must be maintained in some fashion, and these devices may be divided into two classes based upon the food storage method, the first class embodying feeders having a single food reservoir from which measured quantities of food are periodically removed and the second class embodying devices with plural reservoirs, generally one for each feeding period. The instant device is of the latter type which may be readily distinguished from the former in that various predetermined quantities and types of food may be disbursed by the plural reservoir type device whereas the single reservoir device generally may disburse only one type of food in one predetermined quantity. This functional difference is variously but necessarily reflected in the structures giving rise to the function.

The instant feeder positions plural food reservoirs in a circular pattern and moves them in ordered sequence past a disbursement station to provide food disbursement at a single point. The food reservoirs are moved in a time related rotary motion past a disbursement station to provide food disbursement at predetermined time periods. This structure and motion allows inter-position of a time adjustment element between the several food reservoirs and an ultimate disbursing station to regulate absolute timing of the disbursement within a period, ranging continuously over an interval substantially the same as the disbursement period between successive food reservoirs. The prior art devices have generally not provided such an absolute timing adjustment at all and in the few instances where it has been provided this function has been accomplished by complex and costly mechanism.

For an automatic animal feeder to be of any utility it must operate without human attendants and it must have extreme reliability since if it does not properly operate it may cause the death of the animals that it is feeding. The instant invention provides reliability by reason of its simple mechanical structure providing cylindrical food reservoirs that deposit their contents at the disbursement station by action of gravity operated valves. The timed motion of the device is accomplished by mechanical linkage to an ordinary clock mechanism of commerce. The overall reliability is about as great as may be accomplished with any mechanical structure having parts moving relative to each other.

My invention differs from the prior art not in any one of these structures or functions per se but rather in the synergesic combination of all of them in the particular device specified and claimed.

SUMMARY OF INVENTION

My invention generally provides three vertically oriented disc-like elements which rotate relative to each other to periodically disburse the contents of a plurality of radially spaced reservoirs in the upper element through at least partially coincident disbursement orifices in the lower elements.

I provide a circular disc-like base with a relatively large disbursement orifice with a relatively long radial extent inwardly adjacent its periphery. A medial adjustment element resting thereon is pivotably movable relative thereto and provides a disbursement orifice with a somewhat less radial extent to regulate relative time of the disbursement into the base disbursement orifice. A third disc-like reservoir element is pivotably mounted immediately above the adjustment element and provides a plurality of radially spaced cylindrical reservoirs positioned to rotate above the disbursement orifices in both the base and the medial adjustment elements. The lower portion of each reservoir is normally closed by a valve that opens by action of gravity when that individual reservoir passes over the disbursement orifice in the medial adjustment element to deposit its contents therein. A driving mechanism is carried by the base and mechanically interconnected to the uppermost reservoir element to rotate that element at a predetermined speed. Mounting elements are associated with the base to mount the device appropriately for feed deposition.

In creating such a device it is:

A principal object of my invention to create an automatic animal feeder that disburses predetermined quantities of food at predetermined times and at a single point without operator intervention.

A further object of my invention to provide such an animal feeder that has multiple reservoirs containing each quantity of food to be disbursed so that the quantity and type of food may vary between several different reservoirs to allow predetermined variations in feeding.

A further object of my invention to provide such an animal feeder that has a simple adjustment means to regulate an absolute time of feeding between primary cycle timing.

A still further object of my invention to provide such a feeding device that provides rotatively moving elements that may be powered by ordinary clock mechanisms.

A still further object of my invention to provide such a device that has gravity operated valves to reliably disburse individual reservoir contents in a fail-safe fashion.

A still further object of my invention to provide such a feeder that is of simple operation but yet of great reliability.

A still further object of my invention to provide such a feeder that is of new and novel design, of rugged and durable nature, of simple and economic manufacture and one otherwise well suited to the uses and purposes for which it is intended.

Other and further objects of my invention will appear from the following specification and drawings which form a part thereof. In carrying out the objects of my invention, however, it is to be understood that its essential features are susceptible of change in design and structural arrangement with only one preferred and practical embodiment being illustrated in the accompanying drawings, as is required.

BRIEF DESCRIPTION OF DRAWINGS

In the accompanying drawings which form a part hereof and wherein like numbers of reference refer to similar parts throughout.

DESCRIPTION OF THE PREFERRED EMBODIMENT

Figure 1:
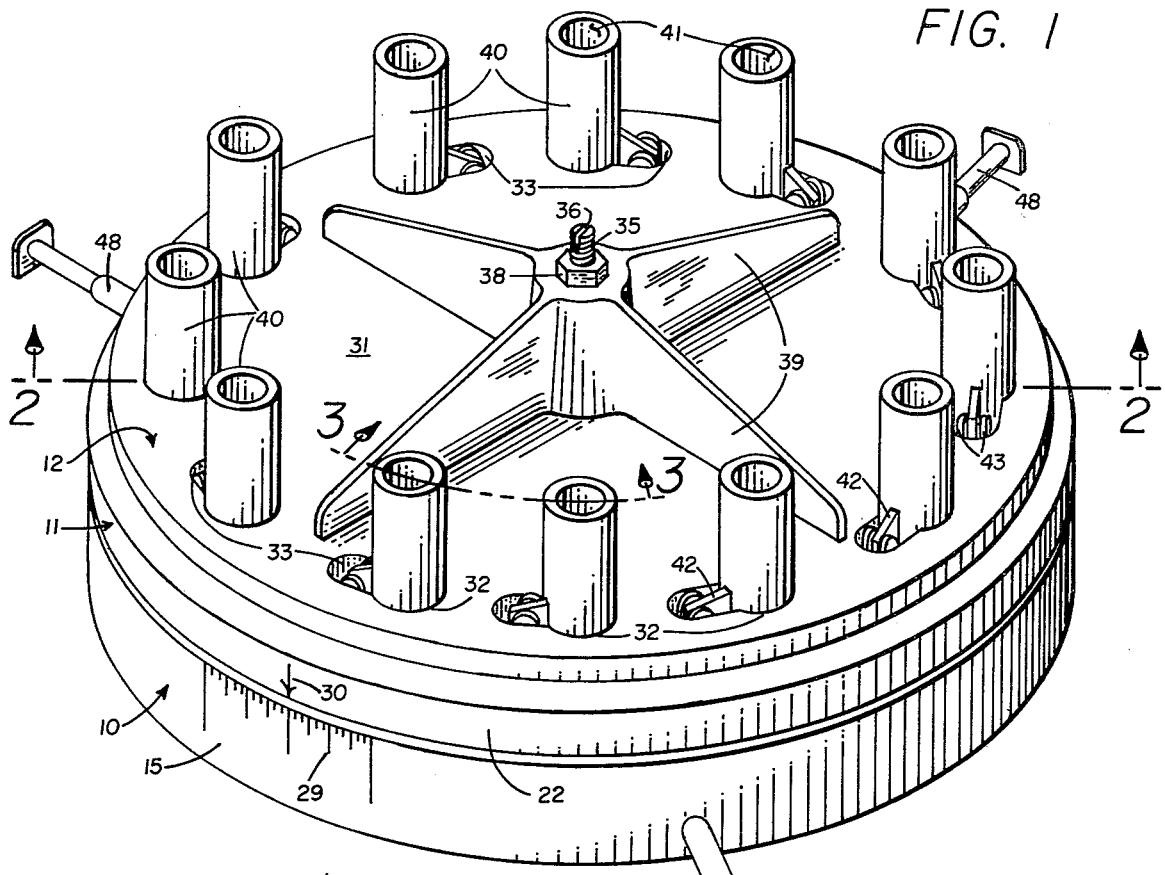
FIG. 1 is an isometric surface view of my invention showing its various parts, their configuration and relationship.

My invention generally provides base 10 pivotably supporting annular medial adjustment element 11 and rotatably supporting storage disc 12 immediately above the adjustment element with driving mechanism 13 rotating the storage element relative to the base.

Base 10 is a cylindrical structure comprising flat circular bottom 14 supporting at its periphery vertically upstanding sidewall 15. The medial portion of the bottom defines pivot base 16 threadedly carrying pivot pin 17 having uppermost pivot point 18. As shown particularly in FIG. 6, elongate annular disbursal slot 19 is defined immediately inwardly adjacent side wall 15. This slot has an arcuate length slightly greater than the angular distance between two adjacent reservoirs on storage disc 12 and its width preferably is at least as great as the diameter of one of the individual reservoirs. Its positioning is such as to be beneath the lower orifices of the several reservoirs.

Medial adjustment element 11 comprises an annular structure having body 20 with circular cylindrical peripheral surface 21 fitting inwardly adjacent the inner surface of side wall 15 of the base. The vertical height of body 20 is somewhat greater than that of body side wall 15 so that the uppermost portion of the body may define outwardly extending annular lip 22 having an outer circular surface substantially coincident with the outer surface of side wall 15 of the base. Upper surface 23 of the body is planar and substantially parallel to bottom 14 of the base. The thickness or radial dimension of body 20 is not particularly critical so long as it is greater than the width of disbursement slot 19 and leaves a sufficient medial void 24 within which driving mechanism 13 may be carried.

Figure 4:
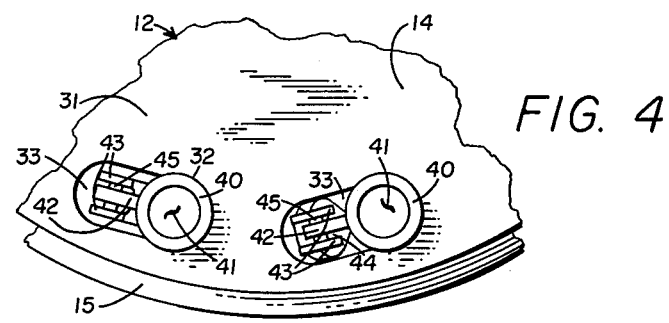
FIG. 4 is a partial top or plan view of the same two reservoirs illustrated in FIG. 3, taken as on a line 4—4 thereon, in the direction indicated by the arrows.
Figure 5:
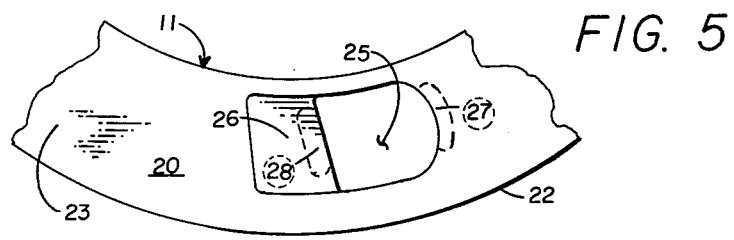
FIG. 5 is a partial top or plan view of the medial adjustment element shown in FIG. 3, taken as on the line 5—5 thereon in the direction indicated by the arrows.
Figure 6:
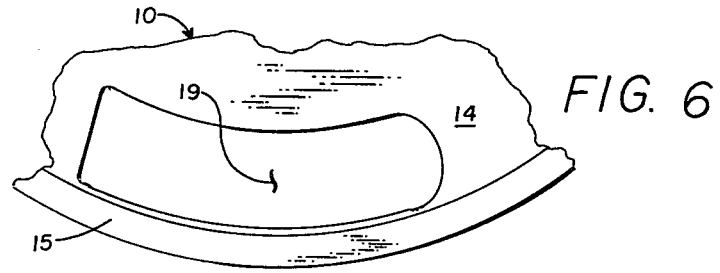
FIG. 6 is a partial top or plan view of the base element shown in FIG. 3, taken as on the line 6—6 thereon in the direction indicated by the arrows.

Vertical disbursement slot 25 is defined vertically through body 20 as shown especially in FIG. 5. This slot is positioned radially, relative to the axis of the device, so as to be rotatable immediately above disbursement slot 19 defined in the base 10. Slot 25 preferably is slightly larger than the disbursement orifices of the individual reservoirs and the same or slightly smaller than the radial dimension or width of disbursement slot 19 defined in the base. The length of slot 25, that is its arcuate dimension, is somewhat greater than the same dimension of an individual reservoir but less than that of disbursement slot 19, all as illustrated in FIGS. 4, 5 and 6 of the drawings. This disbursement slot in the timing disc may be moved pivotably relative to the disbursement slot in the body to regulate the angular position of disbursement of material therethrough to thereby regulate the absolute time of such disbursement within the limits of the disbursement cycles. Normally a somewhat inclined plane 26 is defined in the leading edge of the slot to aid and insure completeness of reservoir valve closing.

The pivotable motion of the adjustment element relative to the base is preferably limited to an arcuate extent of substantially the arcuate distance between successive individual food reservoirs. In the instance illustrated this motion limitation is accomplished by two spaced, depending elements, the forward element 27 defined at the forward edge of medial element disbursement slot 25 and the rearward element 28 defined at the rearward edge of that slot as illustrated particularly in FIGS. 5 and 6. These elements 27, 28 depend into disbursement slot 19 defined in the base but should not project downwardly further than the thickness of the bottom element of the base. The depending elements 27, 28 limit the radial motion of the medial adjustment element relative to the base, and allow the two elements to be assembled only in proper orientation.

Preferably some indicia is provided on the outer surfaces of the base and the timing disc to indicate their relative angular positions to aid in translating these positions to time measure to indicate the time of food deposit relative to the initial positioning of the parts of the device. In the instance illustrated ths measuration means comprises scale 29 carried by the upper portion of the outer surface of side wall 15 of the base and indicator 30 carried by the lower portion of the outer surface of rim 22 of the timing disc. The nature of this scale may be readily determined by well known engineering principles.

Storage disc 12 comprises flat, circular base 31 defining plural radially spaced reservoir holes 32 immediately inwardly adjacent its periphery in a position such that the holes may radially move over the medial portion of the disbursement slots in both the base and the adjustment element. In the instance illustrated these holes are circular and each communicates with an adjacent somewhat smaller valve slot 33 defined in the base in radially symmetrical fashion, that is with all valve slots extending in the same foreward direction from the associated reservoir holes.

Figure 2:
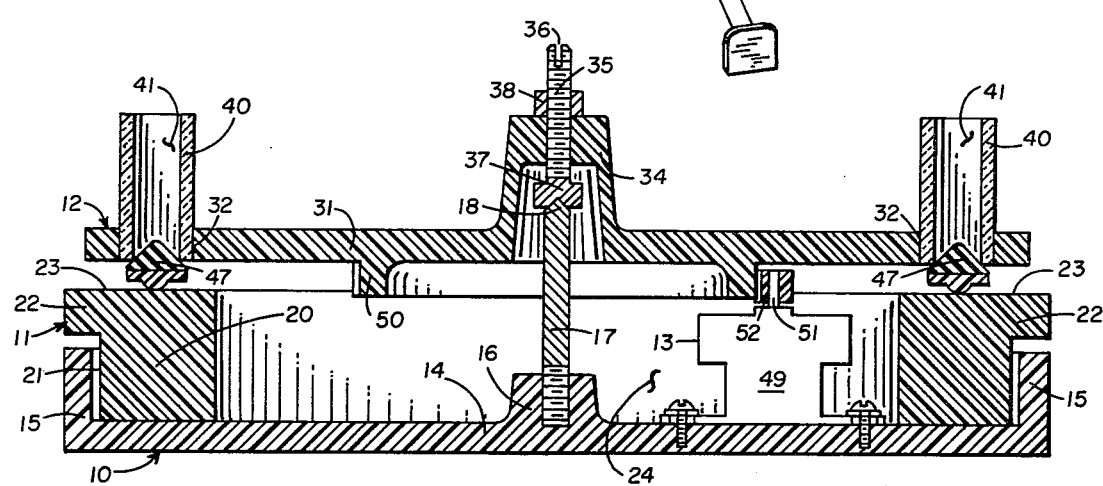
FIG. 2 is a vertical, cross-sectional view on a diameter through the device of FIG. 1, taken on the line 2—2 thereon in the direction indicated by the arrows.

Axially aligned hub structure is defined in the medial portion of base 31 as seen particularly in FIGS. 1 and 2. This hub structure includes upwardly extending hub 34 threadedly carrying pivot pin 35 extending thereabove and therebelow with slot 36 in its upper portion to aid adjustment and pivot head 37 in its lower part to accept low friction support on pivot pin 17 of the base. Adjustment nut 38 is provided on the pivot pin above hub 34 to allow vertical adjustment of the storage disc relative to both the base and adjustment element. Plural arcuately spaced fins 39 extend outwardly from the hub to structurally communicate with the top of the storage disc to provide additional strength and rigidity therefore.

Individual food reservoirs in the instance illustrated are tubular cylinders 40 defining internal reservoir chambers 41. Each reservoir cylinder 40 is carried in one of the reservoir holes 32, with its lowermost surface coincident with the lowermost surface of the storage disc 12 and extends upwardly a distance thereabove to provide an internal channel 41 of appropriate volume to store a desired quantity of food. The shape of this food reservoir is, of course, not critical and for larger amounts of food the structure well might provide a hopper-like configuration in its upper part (not shown).

Figure 3:
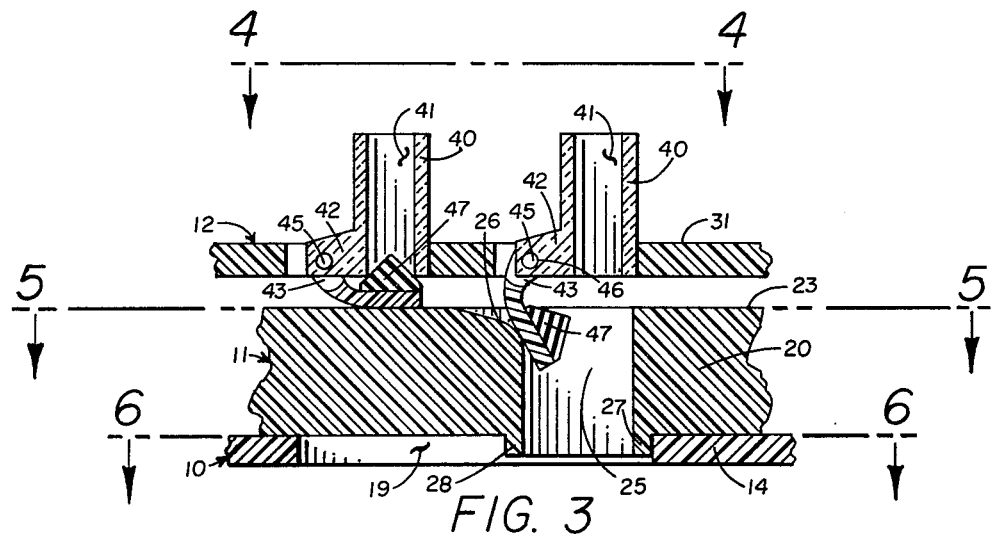
FIG. 3 is a partial vertical, arcuate section taken through two sucessive reservoirs as on the line 3—3 of FIG. 1, in the direction indicated by the arrows thereon, to show particularly the operation of the valving and disbursement structure.

Each reservoir has an associated valving structure as illustrated particularly in FIGS. 1 and 3. Valve mounting ear 42 extends from structural communication with the lower surface of each reservoir toward the valve slot associated with the reservoir hole in which that particular reservoir is carried. "L" shaped valve arm 43 defines valve ear yoke 44 in its shorter arm to allow valve ear 42 to fit therein. The valve yoke is pivotably mounted upon valve ear 42 by means of pin 45 extending through cooperating holes 46 defined in both elements. The upper surface of valve arm 43 carries conical valve body 47 positioned and configured to sealably close the bottom portion of the associated reservoir.

The configuration and dimensioning of these structures is such that the lower surface of valve arm 43 rests upon the upper surface of adjustment element 11. Preferably the lower surface of the valve arm will be rounded or similarly configured to provide a relatively small bearing surface between these two elements to allow easy sliding motion of the elements relative each other and avoid excessive wear. The vertical distance between the lower surface of the storage disc and the upper surface of the adjustment element must be such as to provide this function and this spacing may be easily adjusted to do so by means of the pivot system that suspends the storage disc. The valve arm and valve body must have appropriate mass to allow gravity to operate the valve over the disbursement orifices and of course additional weights may be added to the structure if required to aid this function.

Support structure may be added to the feeder to aid in supporting it in some desired position for use. In the instance illustrated the particular feeding device is adapted for use in feeding fish and support structure comprising three symmetrically positioned telescoping support arms 48 as shown in FIG. 1 is adapted to position the device over an aquarium. Normally any support device will structurally communicate with the base element and be supported thereby. Obviously, other similar types of support device may be used with my feeder without changing its essential nature. Many such support structures have heretofore become known and none is therefore described in detail Motivating means for my invention are provided by motor 49 carried on the upper surface of the bottom of base 10. The motor is mechanically interconnected to storage disc 12 to cause rotation thereof relative to the base. In the instance illustrated this interconnection is provided by spur gear 50, irrotatably carried on motor shaft 51, intermeshedly communicating with circular gear 52 structurally depending from the lower surface of the storage disc. Speed of rotation of the storage disc, and more particularly the time interval between the passage of successive reservoirs over the disbursement slots in the medial timing disc and base, will regulate the feeding interval of the structure. In general, since this interval is usually once or twice per day, the speed of rotation of the storage disc will necessarily have to be quite slow and it will not require very much power in the normal small animal feeder. To provide rotation at speeds and powers in this range I have found that motor 49 may ideally be a typical electric clock.

Normally I prefer to manufacture the principal elements of my feeder, comprising the storage disc, medial timing disc and base, from some rigid material that is fairly light in weight and easy to form such as wood or plastic, though undoubtedly other similar materials would fulfill the purpose of my invention. Preferably the cylindrical tube reservoirs are formed of a clear plastic so that an operator may see what is contained therein and so that measuring indetia may be provided thereon if desired. The pivot structure is preferably formed of metal for appropriate rigidity, strength and durability.

Having thusly described the structure of my invention, its operation may be understood.

Firstly, a feeder is formed according to the foregoing specification and mounted so that disbursement slot 19 in base 10 will be vertically above the position whereat it is desired that feed be deposited. With this positioning support devices 48 are appropriately adjusted to accomplish this end. With the feeder in such position, the several food reservoirs are filled with the amount and type of food to be disbursed and the driving motor is activated.

In this condition the medial timing disc is pivotably moved relative to the base to adjust the absolute time of deposit of feed in the timing cycle which well determines the particular time of day at which food will be deposited. When so adjusted the device then operates automatically to deposit the premeasured quantity of food at the same time during each time interval between the passage of successive reservoirs over the disbursement slot in the medial adjustment disc. This periodic timing will be predetermined by the parameters related to the rotary speed of the motor, the nature of the gearing linkage between motor and storage disc and the angular position and spacing of reservoirs about that disc, all as heretofore well known in the mechanical arts. Normally, however, these parameters will be regulated to move successive reservoirs for deposition of food once or twice each twenty four hour period.

It is to be noted from the foregoing description that any particular number and size of individual storage reservoirs may be provided within the teachings of my invention and though the particular device shown is adapted for use in feeding fish the same principals would apply in feeding various other small animals or in fact even larger animals if the structure be of appropriate size.

It is further to be noted that animals may be fed varying amounts of feed by appropriately varying food amounts in the successive food reservoirs and that various additives to the food may be applied in one or more reservoirs without any necessity of applying it to all reservoirs as is generally the case where automatic feeders are supplied from a single reservoir.

It is further to be noted that my feeding device is readily removable from the feeding position for storage.

The foregoing description of my invention is necessarily of a detailed nature so that a specific embodiment of it might be set forth as required, but it is to be understood that various modifications of detail, rearrangement and multiplication of parts may be resorted to without departing from its essence spirit or scope.

Having thusly described my invention, what I desire to protect by Letters Patent, and

What I claim is:

1. An automatic device to periodically feed animals without human intervention, comprising, in combination:

A base having a planar circular bottom structurally carrying an upstanding side wall about its periphery and having means to support a storage disc thereabove and a disbursement slot defined therethrough inwardly adjacent its periphery;

a medial adjustment element, having an annular body with external diameter slightly less than the internal diameter of the vertical side wall of the body, pivotably carried on the bottom of the base and defining a disbursement slot therethrough inwardly adjacent the periphery of the annular body, said disbursement slot being no larger than the disbursement slot defined in the base and pivotable thereover;

means cooperatively communicating between the base and the medial adjustment element to limit the pivotable motion therebetween to substantially the arcuate distance between two sucessive feed reservoirs;

a flat, circular storage disc, supported on the body and carried a spaced distance above the medial adjustment element, having a plurality of spaced storage reservoirs arcuately arrayed inwardly adjacent its periphery and communicating through the storage disc, each reservoir having associated normally closed gravity activated valving means openable when the reservoir passes over the disbursement orifice in the medial adjustment element; and motor means carried by the base rotate the storage disc relative thereto at predetermined speed.

2. The invention of claim 1 further characterized by: the gravity activated valve structure associated with each reservoir comprising a valve ear extending normally outwardly from the reservoir in the direction of rotation of the storage disc.

a somewhat "L" shaped valve arm having one end pivotably mounted on the outer part of the valve ear for downward pivotal motion and the other end extending under the associated reservoir;

a conical valve carried by the valve arm to close the lower orifice of the associated reservoir, said valve arm being supported in a closed position by the upper surface of the medial adjustment element but openable by gravity when the valving structure passes over the disbursement orifice in the medial adjustment element.

3. The invention of claim 1 further characterized by: the base having to aid its support, comprising three telescopically extensible arms symmetrically carried to extend radially outwardly from the base;

the base and medial adjustment element having indicia to indicate their relative pivotable position; and the means supporting the storage disc above the base being adjustable to regulate relative vertical position of the storage disc.

4. An automatic animal feeder comprising in combination;

a base having a planar circular bottom structurally carrying an upward extending side wall about its periphery, having an upstanding axially aligned pivot pin extending upwardly therefrom, and defining an arcuate disbursement slot therethrough at a spaced distance inwardly from its periphery, said slot having an arcuate length equal to the arcuate distance between two adjacent individual reservoirs;

a medial adjustment element pivotably carried on the bottom of the base and defining a disbursement slot therethrough inwardly adjacent the periphery of the annular body, said disbursement slot being smaller than the disbursement slot defined in the base, being pivotable over the base disbursement slot, and having depending projections in its foreward and rearward portions to fit within the disbursement slot defined in the base to prevent rotation therepast;

a flat circular storage disc having an adjustably depending pivot pin communicating with the upstanding pivot pin of the base for support, a plurality of arcuately spaced storage reservoirs inwardly adjacent its periphery and communicating therethrough, and normally closed, gravity activated valving means associated with each reservoir adapted to open when the associated reservoir passes over the disbursement orifice in the medial adjustment element, said valving means comprising;

a valve ear extending normally outward from the lower portion of a reservoir in direction of the storage disc rotation, an "L" shaped valve arm having a first arm pivotably mounted on the valve ear and the second arm extending under an associated reservoir and a conical valve supported on the upper surface of the second valve arm to close the lower orifice of the associated reservoir, said valve arm being supported in closed position by the upper surface of the medial adjustment element but openable upon passage over the disbursement orifice defined in the medial adjustment element;

a motor carried by the base and mechanically communicating with the storage disc to rotate that disc at a predetermined speed;

means to determine the rotary position of the base relative to the medial adjustment element; and means carried by the base to aid in its support.

* * * * *